SPINDLE ADAPTER

Original Filed Sept. 21, 1965 2 Sheets-Sheet 1

INVENTOR.
PHILIP E O'CONNELL
BY
Eugene M. Whitacre
Attorney

SPINDLE ADAPTER

Original Filed Sept. 21, 1965 2 Sheets-Sheet 2

INVENTOR.
PHILIP E. O'CONNELL
BY
Eugene M. Whitacre
Attorney 3,477,727
SPINDLE ADAPTER
Philip E. O'Connell, Indianapolis, Ind., assignor to RCA Corporation, a corporation of Delaware
Continuation of application Ser. No. 488,951, Sept. 21, 1965. This application Aug. 21, 1967, Ser. No. 671,520
Int. Cl. G11b *17/16, 17/08*
U.S. Cl. 274—10 4 Claims

ABSTRACT OF THE DISCLOSURE

A 45 r.p.m. spindle adaptor has a figure 7 configuration with an opening in one side through which the support shelf and record ejector means of the small diameter spindle extend to support and drop successive lowermost records to the turntable of the record player. The leg portion of the adapter extends toward the turntable and provides a single small area contact within the center hole of a record on the turntable which causes the record to be properly centered as the turntable is rotated.

This application is a continuation of Ser. No. 488,951 filed Sept. 21, 1965, now abandoned.

This invention relates to spindle adapters for phonograph record changers and more particularly to spindle adapters for facilitating the automatic changing of large center hole records.

An object of the invention is to provide an improved spindle adapter for use with an automatic record player having a small diameter spindle to permit playing and automatic changing of records having center holes of a diameter greater than that of the spindle and which is of simplified construction and economical to manufacture.

An adapter embodying the present invention is generally in the configuration of a figure 7 and is adapted to slip over and seat on a small diameter spindle of an automatic record changer. The adapter has an opening in the side thereof through which the support shelf and record ejector means of the small diameter spindle extend to support and drop successive lowermost records to the turntable of the record player. The leg of the adapter extends toward the turntable and provides a single small area contact within the center hole of a record on the turntable which causes the record to be properly centered as the turntable is rotated.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
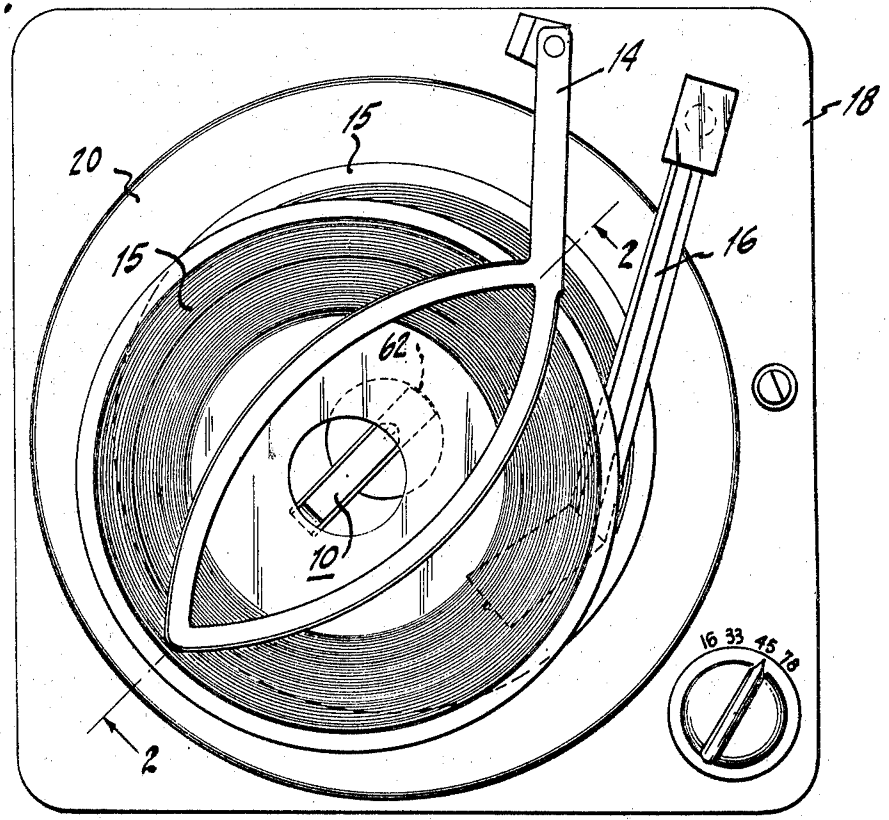
FIGURE 1 is a plan view of a record changer embodying the adapter of the present invention showing the stabilizer arm in operative position and further showing a large center hole record on said adapter and a record in playing position on the turntable.

A preferred embodiment of the adapter of the present invention is indicated generally at 10 and is shown in FIGURES 1 through 5 of the drawings as being mounted on the small diameter record centering spindle 12 of a record changer. Associated with the record changer and shown in FIGURES 1 and 2 in its operative position is a record stabilizer arm 14 which rests upon the uppermost record 15 of a record stack 17 to provide leveling of the stack of records. The stabilizer arm 14 can move to an inoperative position adjacent the tone arm 16 shown in FIGURE 1 for placement or removal of records. The record changer further includes a motorboard 18 which supports a rotatable turntable 20. Extending upwardly centrally of the turntable 20 and in fixed relation thereto is the small diameter spindle 12. The upper end of the spindle 12 is offset slightly to provide a record supporting shelf 22 for supporting a stack of records to be played.

Figure 2:
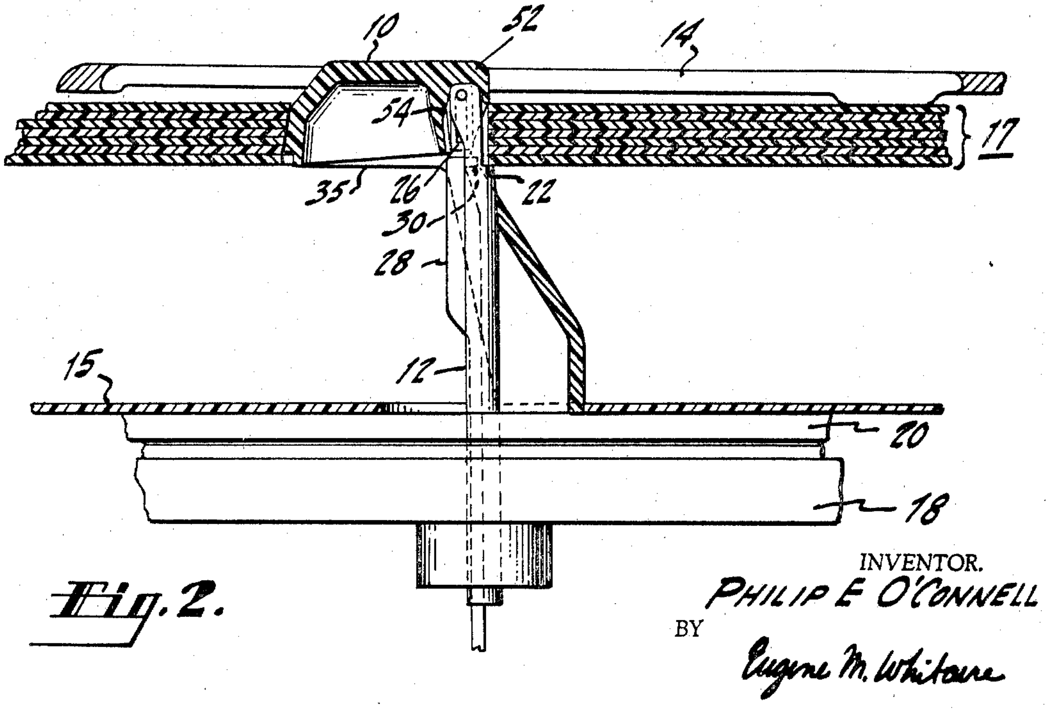
FIGURE 2 is a vertical section taken generally along the section line 2—2 in FIGURE 1 and with records shown on the turntable and supported by the spindle and adapter.

As is conventional with spindles of this type a face 24 on the offset end of the spindle is sloped downwardly and inwardly toward the shelf 22. This part of the spindle mounts a vertically movable slider member 26 which protrudes from the sloped face 24 of the spindle 12. To facilitate removal of small diameter center hole records from the spindle, the member 26 is adapted to move into the body of the spindle 12 when small diameter center hole records are raised upwardly of the spindle. Included within the bottom portion of the spindle 12 for pivotal movement is a record ejector lever 28 which extends axially along the spindle 12 from a height slightly above the shelf 22 to beneath the motorboard 18. As shown in FIGURE 2, the ejector lever 28 has a projecting finger 30 which normally lies at a level slightly above and adjacent the shelf and is urged in a clockwise direction to the position shown in FIGURE 3 by a mechanism (not shown) associated with the cycling mechanism in the record changer. When handling small diameter center hole records, the movement of the ejector lever 28 results in shifting the lowermost record supported on the shelf off the shelf so that the record can drop down along the spindle into operative playing relation on the turntable.

In accordance with the present invention, a spindle adapter 10 is mounted on the small diameter spindle 12 in a manner to utilize the movement of the ejector lever 28 located therein to cause the changing of a large diameter center hole record supported on the spindle shelf 22.

The adapter body is shown separately in FIGURES 6 through 9 and comprises a cantilevered shoulder portion or upper member 32 supported on a generally upstanding leg portion or lower member 34. As shown in the figures, the shoulder portion 32 of the adapter is generally oblong in shape and open at the bottom 35 to define a cavity 36 therein. The end walls 38 and 40 of the shoulder portion 32 are sloped downwardly and away from the leg portion 34 with the overall length of the side walls 42 and 44 being slightly less than or substantially equal to the inside diameter of a large center hole record. A rib section 46 is provided in the cavity 36 to strengthen the shoulder portion 32 and prevent accidental insertion of the small diameter spindle therein.

Figure 7:
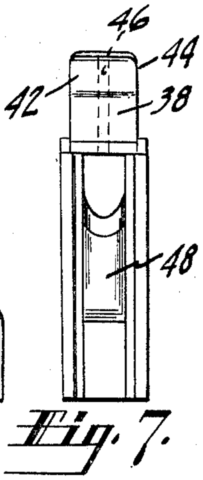
FIGURE 7 is a left side elevation view of the adapter.
Figures 8, 9:
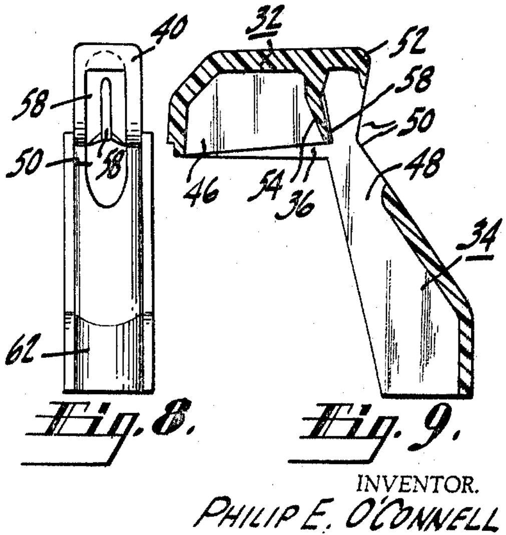
FIGURE 8 is a right side elevation view of the adapter.
FIGURE 9 is a front sectional elevation view of the adapter.

Extending longitudinally through the leg portion 34 of the adapter is a passage 48 for receiving the small diameter spindle 12. As shown in FIGURE 7 the leg is open on one side to facilitate the easy insertion of the adapter on the spindle.

The passage opens 50 to the exterior of the leg portion of the adapter at the area of the shelf portion of the small diameter spindle 12. The opening 50 extends into the shoulder wall so as to provide for exposure of the shelf 22 of the small diameter spindle at a height adjacent the bottom 35 of the adapter shoulder and allow the ejector lever 28 to move in its normal path under the influence of the cycling mechanism associated with the record changer as hereinbefore described.

The leg portion 34 of the adapter extends down to a point adjacent the turntable 20 with the height of the adapter relative to the turntable being fixed by engagement of a capped portion 52 of the adapter shoulder section with the top of the small diameter spindle. A wall member 54 separates the cavity from the capped portion 52 of the shoulder. The adapter is held fixed against rotation relative to the spindle by the engagement of the protruding portion of the slider member 26 in a key slot 58 formed in the wall member 54 of the shoulder.

Figures 3, 4, 5:
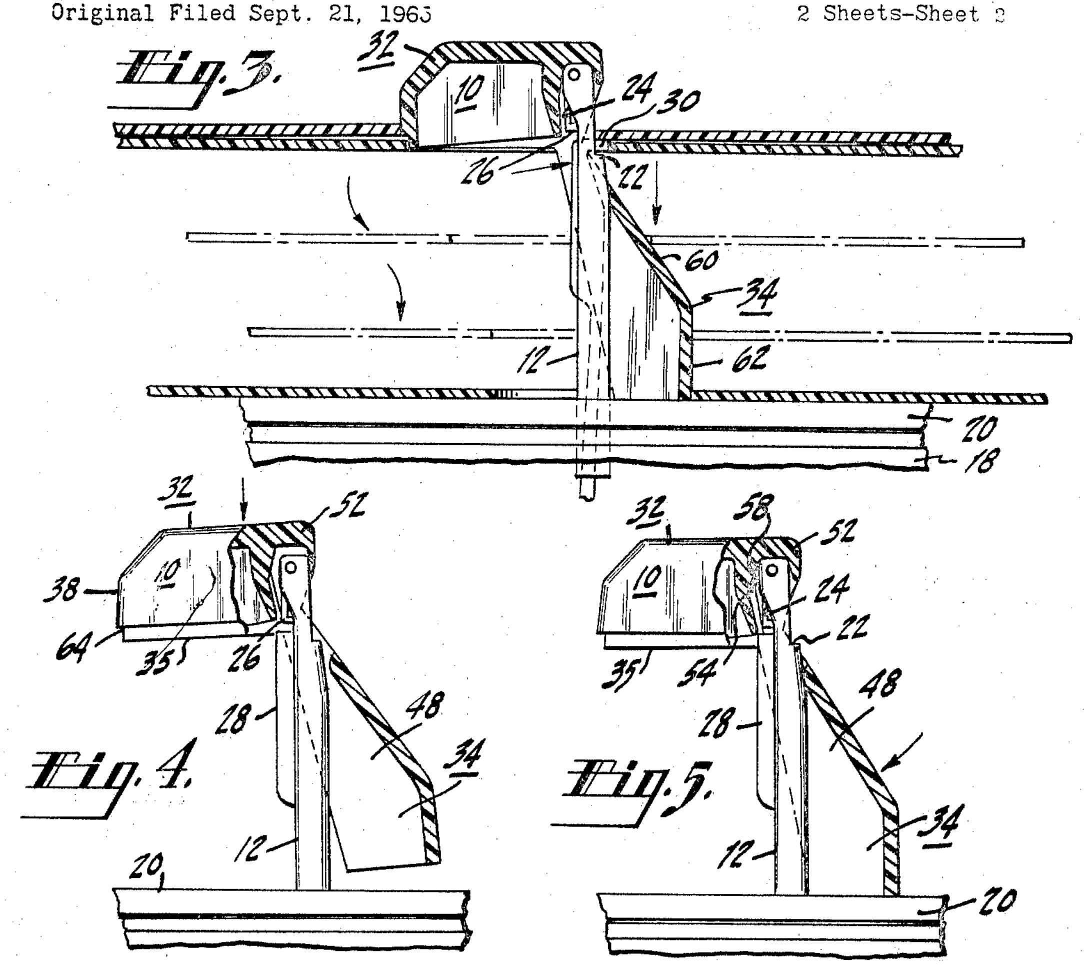
FIGURE 3 is a view similar to that of FIGURE 2 and showing the ejector means in the spindle pushing a record from the shelf of the spindle.
FIGURE 4 is a front elevation view partially in section of the adapter and illustrating the angle and manner in which it is inserted on the spindle.
FIGURE 5 is another view of the adapter partially in section showing its proper placement position on the spindle.
Figure 6:
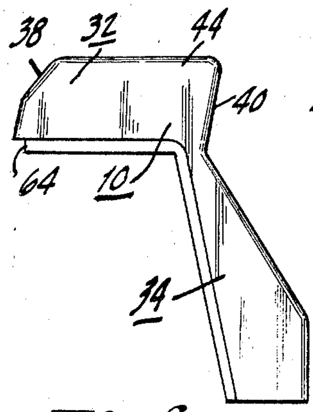
FIGURE 6 is a front elevation view of the adapter.

As shown particularly in FIGURE 3, the outer surface 60 of the upper section of the leg portion 34 is generally inclined at an angle away from said shoulder portion so as to guide a large center hole record downwardly toward the turntable 20. The outer surface 62 of the lower section of the adapter leg extends vertically downward and is curved (see FIGURES 1 and 8) to correspond to the curvature of the center hole of a large diameter center hole record with the radial distance between the surface 62 to the axis of a small diameter spindle 20 properly positioned within the adapter being substantially equal to the inside radius of a large diameter center hole record. The curved surface 62 provides accurate centering of the record during its rotation with the turntable in a manner to be hereinafter described.

The lower portion of the side wall 38 of the shoulder is undercut 64 a distance sufficient to permit shifting of the lowermost large diameter center hole record of a record stack supported on the shelf of the small diameter spindle in a direction to be shifted off the shelf by the ejector lever. The undercut 64 has a height at least equal to the thickness of a large diameter center hole record to permit free movement of a record. The undercut is of a dimension to hold the next to lowermost record against shifting during a record changing operation. The action of the ejector lever 28 in ejecting the large diameter center hole record off the shelf 22 of the small diameter spindle 12 utilizing the adapter of the present invention is shown particularly in FIGURES 2 and 3. It will be noted that the opening 50 in the leg and shoulder portions is sufficiently large to facilitate easy placement of the adapter of the present invention on the small diameter spindle so that the slider member 26 engages the key slot 58.

To insert the adapter of the present invention on a small diameter spindle of a record changer, it is preferable to tilt the adapter to an angle of about 30° (FIGURE 4) and then place it over the spindle so that the spindle enters the leg passage 48. The adapter is then rotated over the top portion of the spindle and pressed down so that the top of the spindle seats in the capped portion 52 of the shoulder with the slider member engaging the key slot 58 in the wall member 54 (FIGURE 5). Large diameter center hole records can then be placed over the shoulder portion of the adapter so that the lowermost or bottom record rests on the shelf 22 of the small diameter spindle. The stabilizer arm 14 is then positioned so that it rests on the uppermost record in the stack to provide a leveling support of the records. The bottom record in the stack is dropped to the turntable by the action of the record ejector lever 28 which pushes the record into the undercut portion 64 of the adapter shoulder and off the spindle shelf 22 during the cycling of the changer mechanism. The second record from the bottom is held from moving with the bottom record by the side wall portion 38 of the adapter shoulder which has not been undercut.

As the turntable is rotated, the turning of the record will automatically force the center hole in the record up against the outer surface of the lower section of the adapter to place all points of the perimeter of the record center hole at equal distances from the center of rotation. Centering is usually complete within one revolution of the turntable, and is maintained as long as the turntable is in motion. Due to the small arc length of the surface of the lower section of the adapter leg, relative to the perimeter of the record hole, an accurate centering of the record is achieved with a minimum of frictional contact between the adapter and the record.

What is claimed is:

1. A spindle adapter for automatic record changers of the type having a turntable and a small diameter record centering spindle formed with a shelf on one side thereof to support a stack of records having center holes of correspondingly small diameter comprising:
   - an upstanding leg portion; and
   - a shoulder portion cantilevered out from the upper part of said upstanding leg portion;
   - said shoulder and leg portions including a passageway within to receive the small diameter spindle, and means within said passageway for seating said adapter so that the leg portion extends primarily on the shelf side of said small diameter spindle to a point adjacent the turntable,
   - said passageway having a first intermediate the shoulder and leg portions of said adapter to expose the shelf of said small diameter spindle externally to the contour of said adapter to provide a support level for large diameter center hole records, the major portion of the passageway in said leg portion being completely open on the side opposite said first opening to facilitate the attachment and removal of said adapter from said small diameter spindle,
   - said adapter shoulder portion conformed for guiding the lowermost record of a large diameter center hole record stack to said support level,
   - said adapter leg portion conformed for guiding the lowermost record from said shelf towards said turntable,
   - the outer peripheral edge near the bottom of said adapter leg portion being convexly shaped and extending arcuately for a distance equal to a minor part of the periphery of the center hole of a large diameter center hole record to provide a single small area contact with a large diameter center hole record on the turntable so as to cause said record to be properly centered as said turntable is rotated,
   - said surface being radially spaced from the center of said spindle by a distance substantially equal to the radius of the center hole of said large diameter center hole record.

2. A spindle adapter as defined in claim 1 and including means on said adapter shoulder portion engageable with said small diameter spindle to lock said adapter to said small diameter spindle and against rotation with said turntable.

3. For use with an automatic record changer having a turntable and turntable spindle of relatively small diameter formed with a shelf on one side thereof to support a stack of records having center holes of correspondingly small diameter, said small diameter spindle including within itself record ejector means for pushing the lowermost record resting on the spindle shelf off the shelf;
   - an adapter body to permit centering of large diameter center hole records, said body being of one-piece construction and comprising a shoulder portion cantilevered on an upstanding leg portion, said adapter including a passageway within to receive a small diameter spindle, means within said passageway for seating said adapter so that the leg portion extends primarily on the shelf side of said small diameter spindle to a point adjacent the turntable, said passageway having a first opening intermediate the shoulder and leg portions of said adapter to expose the shelf of said small diameter spindle externally to the contour of said adapter to provide a support level for large diameter center hole records, the major portion of the passageway in said leg portion being completely open on the side opposite said first opening to facilitate the attachment and removal of said adapter from said small diameter spindle, said adapter shoulder portion conformed for guiding the lowermost record of a large diameter center hole record stack to said support level, said opening also providing exposure of said ejector means for pushing the lowermost record of said records stack off said spindle shelf, said adapter leg portion conformed for guiding the lowermost record pushed off said shelf towards said turntable, the outer peripheral edge near the bottom of said adapter leg portion being convexly shaped and extending arcuately for a distance equal to a minor part of the periphery of the center hole of the large diameter center hole record to provide a single small area contact with a large diameter center hole record on the turntable so as to cause said record to be properly centered as said turntable is rotated, said surface being radially spaced from the center of said spindle by a distance substantially equal to the radius of the center hole of said large diameter center hole record.

4. An adapter body as defined in claim 3 and including means on said adapter body engageable with said small diameter spindle to lock said adapter to said small diameter spindle and against rotation with said turntable.

References Cited

UNITED STATES PATENTS

| | | |
|---|---|---|
| 3,191,941 | 6/1965 | Krahulec. |
| 3,191,942 | 6/1965 | Tatter. |
| 3,301,562 | 1/1967 | Tatter. |

HARRY N. HAROIAN, Primary Examiner